L. A. ROSENBLATT.
PROCESS FOR DEALCOHOLIZING LIQUORS.
APPLICATION FILED MAR. 22, 1916.
1,201,873.  Patented Oct. 17, 1916.
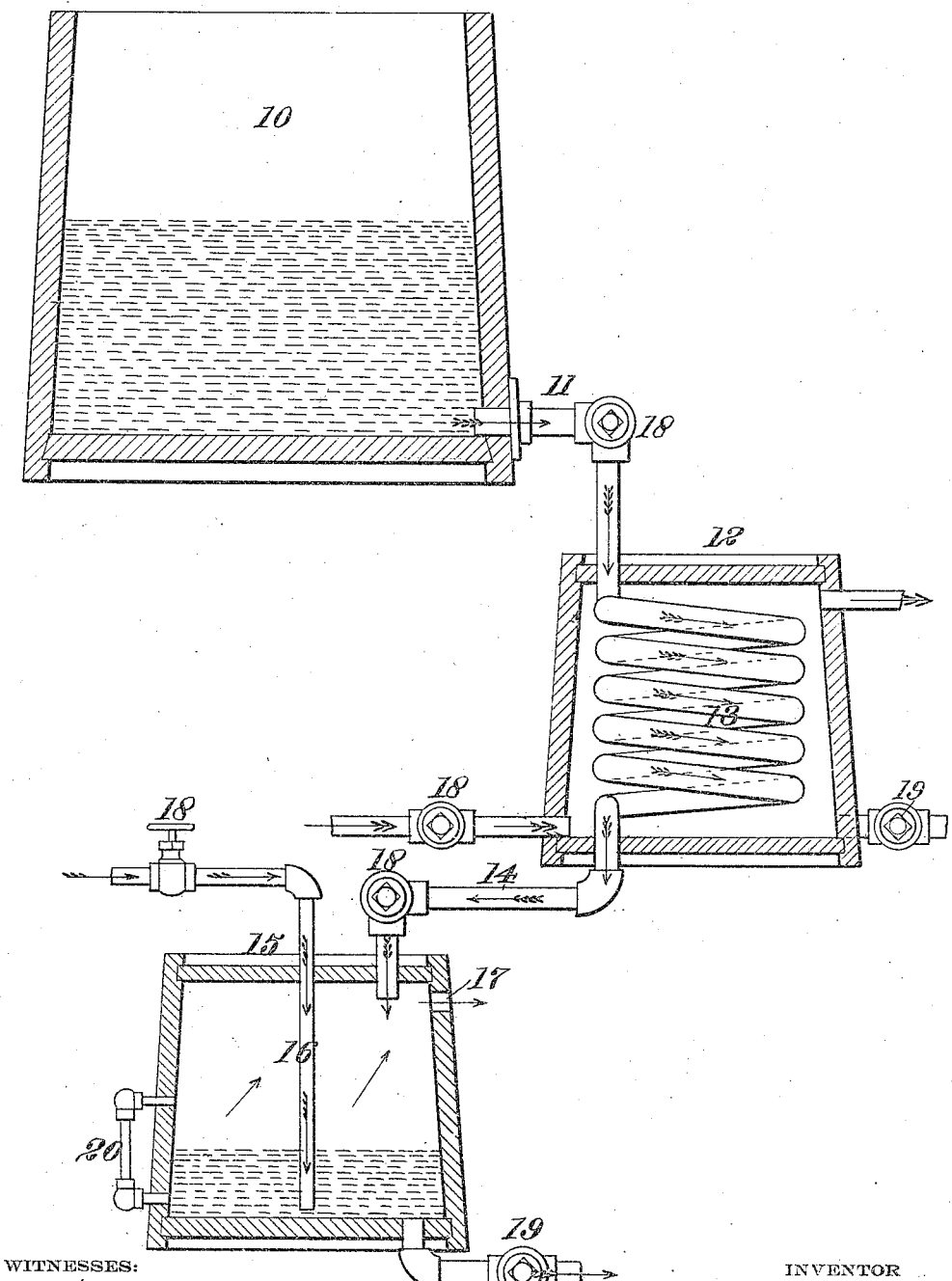
WITNESSES:
Charles Pickles
Frances V. Cole
INVENTOR
Laurence A. Rosenblatt
BY Strong & Townsend
ATTORNEYS

UNITED STATES PATENT OFFICE.

LAURENCE A. ROSENBLATT, OF SAN FRANCISCO, CALIFORNIA.

PROCESS FOR DEALCOHOLIZING LIQUORS.

1,201,873. Specification of Letters Patent. Patented Oct. 17, 1916.

Application filed March 22, 1916. Serial No. 85,870.

*To all whom it may concern:*

Be it known that I, LAURENCE A. ROSENBLATT, a citizen of the United States, residing in the city and county of San Francisco and State of California, have invented new and useful Improvements in Processes for Dealcoholizing Liquors, of which the following is a specification.

This invention relates to the treatment of alcoholic beverages and liquors, and has for its object to accomplish the de-alcoholization of such liquors in a simple and inexpensive manner without materially impairing the flavor and taste or reducing the quantity of the beverage treated. In carrying out this object I first heat the liquor by indirect application of heat, bringing it to a temperature under that of boiling and then, by the direct application of steam, the temperature of the pre-heated beverage is raised sufficiently to drive off the alcohol in the form of a vapor.

One form of apparatus for practising my invention is exemplified in the following description and illustrated in the accompanying drawing, wherein I have shown a suitable-storage container 10 of any convenient size with which communicates through a pipe or conduit 11, a pre-heating device consisting of a tank 12 to contain hot water, and within which is a coil of pipes 13 connected at one end to the pipe 11 and at the other end to a pipe 14 for conveying the liquor slowly through the water in the tank for the purpose of heating the same preparatory to further treatment.

The pipe 14 enters a closed tank 15 of comparatively large capacity and within which is arranged a vertical pipe 16 terminating at one end near the bottom of the tank and having the other end connected to a source of steam supply (not shown). A discharge orifice 17 is arranged near the top of the tank for the escape of steam and other volatile substances.

In practising my invention a liquor such as wine stored in the vessel 10 is let into the coil 13 where hot water in the tank 12 at a temperature below boiling causes a heating of the wine preparatory to delivering it to the steam chamber 15.

Less than one-third the full quantity of the tank 15 is let into this steam chamber and steam is injected therein through the pipe 16 near the bottom of the tank. The steam passing up through the wine will cause an ebullition thereof for a sufficient length of time and at a temperature just high enough to vaporize the alcohol and other volatile substances contained in the wine, the steam and alcoholic vapors passing off through the discharge orifice 17 near the top of the tank. The size of the orifice 17 is slightly larger than that of the steam pipe 15, so that the vapors are driven off forcefully and the alcohol will not condense and fall back into the tank. The discharge from the orifice containing the alcoholic vapors is preferably allowed to be wasted.

Steam is injected until the predetermined boiling point of the dealcoholized residue is reached, at which time all alcohol will be driven off. The process at this point is discontinued and the boiling of the residue is prevented.

By having the beverage pre-heated the steam passed therethrough is not condensed to such a degree as to deposit water therein in sufficient quantities to dilute the beverage, the amount of condensation being approximately equal to the volume of alcohol driven off. The duration of the process is about one hour's time, for a volume of twenty gallons of wine in a fifty gallon container, preheated to about 180 degrees F., where steam at sixty pounds pressure is employed. Various tests may be employed to determine when the process is completed. By the application of steam to the pre-heated wine, the essential qualities that go to make up the flavor and taste are not impaired and boiling of the same can be avoided, inasmuch as alcohol will vaporize at a lower temperature than the wine.

Stop cocks or control valves 18 are preferably employed between adjacent tanks and suitable taps 19 are used in each tank to draw off the contents. A glass gage 20 is preferably fitted to the steam tank to show the color and action of the liquor being treated.

Among the advantages of my process may be mentioned the following: The amount of alcoholic beverage put into the apparatus and the amount of de-alcoholized beverage taken out are approximately equal, due to the fact that the beverage having been preheated will not take up any excessive water from the steam. There is no impairment of taste or flavor of the beverage, inasmuch as the volatile substances driven off with the alcohol may be considered as negligible and the proportion of the component parts to the whole remains unchanged in the residual wine.

The herein described process may obviously be used to treat any alcoholic beverage or liquor and the apparatus may be varied and modified in many respects without departing from the spirit of my invention, as disclosed in the appended claims.

Having thus described my invention, what I claim and desire to secure by Letters Patent is—

1. A process of de-alcoholizing wine and other alcoholic liquors which consists in preheating the liquor to a predetermined temperature, and then passing steam under high pressure and in large excess through said hot liquor to vaporize and carry off the alcohol, the temperature to which the liquor is preheated and the pressure of the steam being such that only sufficient steam is condensed to maintain the volume of liquor practically constant.

2. A process of de-alcoholizing liquor which consists in passing the same through a coil immersed in hot water at a temperature below boiling to pre-heat the liquor, passing the preheated liquor into a closed vessel, injecting steam under pressure and in large excess through the liquor in the closed vessel to cause vaporization of the alcohol and allowing the alcoholic vapors to pass off with the steam, while maintaining the volume of liquor practically constant.

3. A process of de-alcoholizing liquors, which consists in preheating the liquor to about 180 degrees F. depositing the preheated liquor in a steam chamber at atmospheric pressure and then passing steam through the liquor so as to vaporize and sweep out the alcohol while maintaining the volume of liquor practically constant, and discontinuing the application of steam when the predetermined boiling point of the de-alcoholized residue is reached.

In testimony whereof I have hereunto set my hand in the presence of two subscribing witnesses.

LAURENCE A. ROSENBLATT.

Witnesses:
JOHN H. HERRING,
W. W. HEALEY.